(12) United States Patent
Kim et al.

(10) Patent No.: US 10,412,791 B2
(45) Date of Patent: Sep. 10, 2019

(54) INDUCTION HEATING DEVICE AND METHOD OF CONTROLLING THE SAME

(71) Applicant: LG ELECTRONICS INC., Seoul (KR)

(72) Inventors: Jayoen Kim, Seoul (KR); Woojin Suh, Seoul (KR); Joohyeon Oh, Seoul (KR); Yoonjung Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 143 days.

(21) Appl. No.: 15/471,732

(22) Filed: Mar. 28, 2017

(65) Prior Publication Data

US 2017/0280514 A1 Sep. 28, 2017

(30) Foreign Application Priority Data

Mar. 28, 2016 (KR) .................. 10-2016-0036674

(51) Int. Cl.
*H05B 6/12* (2006.01)
*F24C 9/00* (2006.01)

(52) U.S. Cl.
CPC ............ *H05B 6/1218* (2013.01); *F24C 9/00* (2013.01); *H05B 2213/07* (2013.01)

(58) Field of Classification Search
CPC ...... F24C 9/00; H05B 6/1218; H05B 2213/07
USPC ....... 219/627, 620, 622, 624, 626, 441, 506, 219/445.1, 452, 453, 448, 451; 324/663, 324/686, 671, 687, 688, 690; 99/321, 99/326; 126/39 BA
See application file for complete search history.

(56) References Cited

U.S. PATENT DOCUMENTS

2011/0303653 A1* 12/2011 Chun ................. H05B 6/062
219/624
2014/0225448 A1 8/2014 Kitaizumi et al.

FOREIGN PATENT DOCUMENTS

| DE | 44 05 610 | 8/1995 |
| DE | 11 2013 004163 | 5/2015 |
| EP | 2 395 813 | 12/2011 |
| EP | 2 950 614 | 12/2015 |
| JP | 2005-249318 | 9/2005 |
| JP | 2011-113953 | 6/2011 |
| JP | 2011-204362 | 10/2011 |
| JP | 2014-235841 | 12/2014 |

OTHER PUBLICATIONS

Translation of JP2011-113953A, Nichiwa Denki K.K., Jun. 9, 2011, Japan Patent Office. (Year: 2011).*
Translation of DE112013004163T5, LG Electronics Inc., http://patentscope.wipo.int/search/en/detail.jsf? (Year: 2015).*

(Continued)

*Primary Examiner* — Quang T Van
(74) *Attorney, Agent, or Firm* — KED & Associates LLP

(57) ABSTRACT

An induction heating device and a method of controlling the induction heating device are provided. The induction heating device may include a working coil, a power supply to provide an induction voltage to operate the working coil, a temperature sensor to sense a temperature of a cooking utensil, a first lighting unit to emit visually perceivable light, a second lighting unit to emit visually perceivable light, and a controller for controlling the first lighting unit based on the sensed temperature of the cooking utensil transmitted from the temperature sensor.

18 Claims, 13 Drawing Sheets

(56) References Cited

OTHER PUBLICATIONS

Translation of JP2005-249318A, Sanyo Electric Co., Ltd. et al), Sep. 15, 2005, Japan Patent Office (Year: 2005).*
International Search Report dated Aug. 11, 2017 issued in Application No. PCT/KR2017/003301.
European Search Report dated Aug. 11, 2017 issued in Application No. 17163280.5.

* cited by examiner

INDUCTION HEATING DEVICE AND METHOD OF CONTROLLING THE SAME

CROSS-REFERENCE TO RELATED APPLICATION

This application claims the priority benefit of Korean Patent Application No. 10-2016-0036674, filed Mar. 28, 2016, the subject matter of which is incorporated herein by reference.

BACKGROUND

1. Field

Embodiments may relate to an induction heating device. More particularly, embodiments may relate to an induction heating device to be provided on a table or the like, and that has a beautiful appearance.

2. Background

A table in restaurants or homes may be used for having meals or placing objects thereon.

Induction heating devices may generate heat using an induction heating method, which is environmentally friendly and does not generate gaseous carbon.

In the past, tabletop-pad-type induction heating devices, which may be provided on the table when used, have been manufactured.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
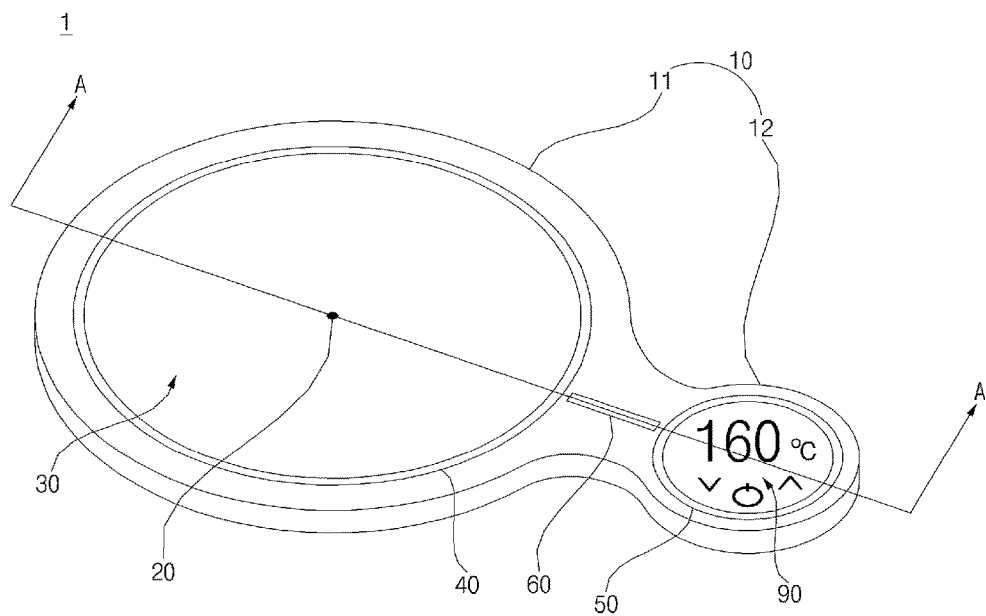
FIG. 1 is a conceptual view illustrating an induction heating device according to an example embodiment.

Advantages and features and methods for achieving those of the present disclosure may become apparent upon referring to embodiments described later in detail with reference to the attached drawings. However, embodiments are not limited to the embodiments disclosed hereinafter and may be embodied in different ways. The embodiments are provided for perfection of disclosure and for informing persons skilled in this field of art of the scope. The same reference numerals may refer to the same elements throughout the specification.

Spatially-relative terms such as "below", "beneath", "lower", "above", or "upper" may be used herein to describe one element's relationship to another element as shown in the Figures. It will be understood that spatially-relative terms are intended to encompass different orientations of the device in addition to the orientation shown in the Figures. For example, if the device in one of the figures is turned over, elements described as "below" or "beneath" other elements would then be oriented "above" the other elements. The exemplary terms "below" or "beneath" can therefore encompass both an orientation of above and below. Since the device may be oriented in another direction, the spatially-relative terms may be interpreted in accordance with the orientation of the device.

The terminology used in the present disclosure is for the purpose of describing particular embodiments only and is not intended to limit the disclosure. As used in the disclosure and the appended claims, the singular forms "a", "an" and "the" are intended to include the plural forms as well, unless context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, thickness or size of each layer may be exaggerated, omitted, or schematically illustrated for convenience of description and clarity. Also, size or area of each constituent element does not entirely reflect the actual size thereof.

Hereinafter, exemplary embodiments may be described with reference to the accompanying drawings.

Figure 2:
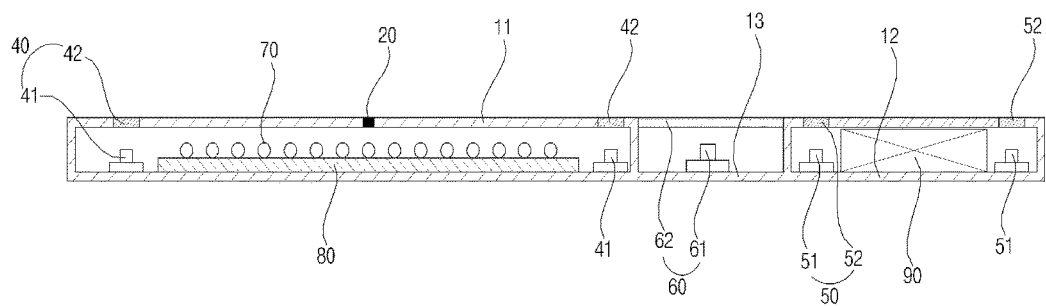
FIG. 2 is a sectional view taken along line A-A in the induction heating device shown in FIG. 1.
Figure 3:
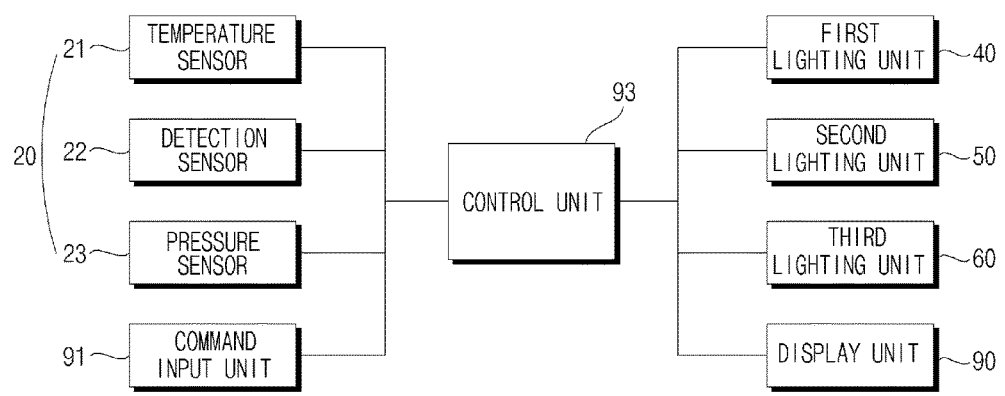
FIG. 3 is a block diagram of an induction heating device according to an example embodiment.

FIG. 1 is a conceptual view illustrating an induction heating device according to an example embodiment. FIG. 2 is a sectional view taken along line A-A in the induction heating device shown in FIG. 1. FIG. 3 is a control block diagram of an induction heating device according to an example embodiment. Other embodiments and configurations may also be provided.

Referring to FIGS. 1 to 3, an induction heating device 1 may include a working coil 70 for creating a magnetic field for an induction of eddy current in a cooking utensil so as to heat the cooking utensil, a power supply unit 80 (or power supply) for providing induction voltage to operate the working coil 70, a temperature sensor 21 for detecting (or sensing) a temperature of the cooking utensil, a first lighting unit 40 (or first lighting device) for emitting visually perceivable light, a second lighting unit 50 (or second lighting device) for emitting visually perceivable light, and a control unit 93 (or controller) for controlling the first lighting unit 40 based on the temperature of the cooking utensil detected (or sensed) by the temperature sensor 21.

The induction heating device 1 may heat a cooking utensil through the induction of eddy current in the cooking utensil. The induction heating method may be a method of heating metal using an electromagnetic induction phenomenon. The induction heating device 1 may operate based on a wireless charging transmitter for supplying power to an electronic appliance through interaction with a wireless charging receiver provided at the electronic appliance.

The working coil 70 may heat the cooking utensil. The working coil 70 may create a magnetic field using induction voltage supplied from the power supply unit 80, and heat the cooking utensil through the induction of eddy current in the cooking utensil. Therefore, the induction heating device may convey a reduced burn risk, and may not emit gaseous carbon or particulate matter, unlike a disadvantageous method of directly heating a cooking utensil using a fossil fuel or the like.

The working coil 70 may be shielded by a protection member (not shown). The protection member may cover two opposite sides or an entire area of the working coil 70 so as to protect the working coil 70 from external shocks.

The power supply unit 80 (or power supply device) may be electrically connected with an external power source so as to provide an induction voltage. The power supply unit 80 may be an inverter for converting power from the external power source into induction voltage. The power supply unit 80 may include a wireless charging receiver for generating power through electromagnetic induction with an external wireless charging transmitter. Therefore, the power supply unit 80 may be electrically connected with the external power source in a wireless manner. The power supply unit 80 may be a power supply and/or a power supply device.

A wireless charging system may include a wireless charging transmitter and a wireless charging receiver. The wireless charging system may employ one of the following two charging methods.

The wireless charging system may be classified into an electromagnetic induction type and/or a magnetic resonance type.

Electromagnetic induction may refer to a phenomenon in which voltage is induced so that current flows when a magnetic field is varied around a conductor, thereby charging a power supply unit that serves as a driving source for driving an electronic appliance.

Magnetic resonance may use a strong magnetic field coupling phenomenon, which is formed between magnetic resonators having a same resonant frequency. Current may be generated by connecting one coil to a wireless charging transmitter and connecting another coil to an electronic appliance, and by causing them to vibrate at a same frequency based on a resonance phenomenon, in which the amplitude of vibration is remarkably increased at a specific frequency.

The electromagnetic induction method may have a relatively high charging efficiency (90% of the charging efficiency of wired charging), but may have a shortcoming in that a wireless charging transmitter and a wireless charging receiver need to be located close to each other (i.e., within 1 to 2 cm, for example). On the other hand, the magnetic resonance method may achieve long-distance charging, but may have a shortcoming of a relatively low charging efficiency (70% of the charging efficiency of wired charging).

The wireless charging system may employ any kind of wireless charging method; however, the embodiment may employ the magnetic resonance method.

The power supply unit 80 (or power supply), the working coil 70, the first lighting unit 40, the second lighting unit 50, and the control unit 93 may be provided in a case 10. The case 10 may further accommodate a third lighting unit 60, a display unit 90 (or display), and a sensor unit 20. The case 10 may form an outer appearance of the induction heating device 1.

The case 10 may be formed to have various shapes. For example, as shown in FIG. 1, the case 10 may be formed such that a large circular-shaped body and a small circular-shaped body are connected to each other in a lateral direction when viewed from above. The working coil 70 may be disposed in the large circular-shaped body, and the control unit 93 and the display unit 90 may be disposed in the small circular-shaped body.

The case 10 may be formed of a material that does not interrupt generation of electromagnetic induction between the induction heating device and an electronic appliance or a cooking utensil, and that has a predetermined thermal resistance and hardness. The case 10 may include a transparent material and/or a translucent material, through which light emitted from a light source may pass. The case 10 may have thermal resistance, non-transmissivity of light and a non-magnetic property. For example, the case 10 may include any one of a wood material and a resin material; however, material of the case 10 is not limited thereto.

In order to prevent light emitted from the plurality of lighting units from leaking, the case 10 may be separated into a plurality of sections. More specifically, the case 10 may include a first case 11, a second case 12, and a third case 13.

The first case 11 may have therein an internal space, in which at least the working coil 70, the first lighting unit 40 and the sensor unit 20 are provided. More specifically, the first case 11 may define a space for accommodating the working coil 70 and the first lighting unit 40 therein. The sensor unit 20 may include a temperature sensor 21, a detection sensor 22, and a pressure sensor 23, for example. The sensor unit 20 may be disposed at a position that overlaps the working coil 70 in a vertical direction. A cooking utensil may be provided on the first case 11.

The second case 12 may have therein an internal space, in which at least the second lighting unit 50 and the display unit 90 are disposed. The second case 12 may be spaced apart from the first case 11. The display unit 90 (or display) may display visually perceivable information about the induction heating device 1. The display unit 90 may be disposed at the second case 12 (or in the second case).

The third case 13 may define a space in which at least the third lighting unit 60 is disposed. The third case 13 may be interposed between the first case 11 and the second case 12 so as to connect the first case 11 and the second case 12. The first to third cases 11, 12 and 13 may be formed integrally with or separately from each other.

The lighting unit may emit visually perceivable light. The lighting unit may output a visually perceivable image. The lighting unit may be turned on and off in sections or in its entirety. Illuminance and color of the lightning unit may be controlled in response to control signals from the control unit 93.

More specifically, the lighting unit may be provided in a singular or plural number. Light-emitting diodes (LEDs) may be employed as the lighting unit.

The LEDs may be classified into a lateral type and a vertical type in accordance with arrangement of electrodes and structure of chips, and may be manufactured in the form of a surface-mount device (SMD) so as to be mounted on a printed circuit board (PCB) in order to realize slimness of the lighting unit.

The LEDs may be configured to respectively emit white light for illumination, or red LEDs, green LEDs and blue LEDs may be combined so as to emit light of a specific color or white light. There may be a limitation in precisely controlling the illuminance of an analog light-emitting device, whereas may be is possible to precisely control illuminance of an LED by adjusting the amount of current and the width of a driving pulse applied to the LED. Further, in the case in which red (R) LEDs, green (G) LEDs and blue (B) LEDs are combined, light of a specific color may be provided for a specific space and a color temperature may be easily adjusted.

In an example, in which 8 bits of control is performed for current for driving an LED, illuminance of the LED may be adjusted within a grayscale range of 256. Further, the color temperatures of RGB LEDs may be selectively adjusted. Furthermore, the adjustment of the grayscale levels and the adjustment of the color temperatures may be achieved for an individual LED, may be achieved for the predetermined number of LEDs in each group, and/or may be achieved for all the LEDs mounted in a specific space.

Accordingly, light of high quality may be provided for a certain space using LEDs and power consumption that is required to drive the LEDs may be reduced.

The lighting unit may include a first lighting unit 40 (or first lighting device) disposed in the first case 11, a second lighting unit 50 (or second lighting device) disposed in the second case 12, and a third lighting unit 60 (or third lighting device) disposed in the third case 13.

The first lighting unit 40 may be disposed in the first case 11. The first lighting unit 40 may be turned on and off in its entirety or in sections. Illuminance and color of the first lightning unit 40 may be controlled in response to control signals from the control unit 93. The first lighting unit 40 may indicate information about a state of a cooking utensil provided on the first case 11.

The first lighting unit 40 may be arranged along at least a portion of a predetermined boundary that surrounds the working coil 70. That is, the first lighting unit 40 may indicate the region within which the working coil 70 is operated. More specifically, the first lighting unit 40 may indicate an operation region of the working coil 70 by emitting light in the upward direction of the first case 11.

The first lighting unit 40 may include first light sources 41 and a first diffuser 42 for diffusing and radiating light incident from the first light sources 41. The first light sources 41 may be embodied as the above-described LEDs. The first light sources 41 may be disposed inside the first case 11. The first light sources 41 may be arranged at a constant pitch along a predetermined boundary that surrounds the working coil 70 when viewed from above.

The first diffuser 42 may be disposed at a top surface of the first case 11 in order to diffuse light incident from the first light sources 41 in a horizontal direction and to radiate the same in an upward direction. More specifically, the first diffuser 42 may be disposed along a predetermined boundary that surrounds the working coil 70 when viewed from above. That is, the first diffuser 42 may be formed in an annular shape. The first diffuser 42 may be configured as a unitary member or as a plurality of members.

The first diffuser 42 may function to uniformly distribute brightness of incident light, to convert incident point light into surface light, and to radiate the surface light in the upward direction of the first case 11. For example, the first diffuser 42 may have a hollow metal tube configuration exhibiting transparence such that light propagates internally therewithin. More specifically, the first diffuser 42 may be a flat type or a wedge type using polymethylmethacrylate (PMMA) or a transparent acrylic resin material. Alternatively, the first diffuser 42 may include a lens made of a glass or plastic material; however, the first diffuser 42 is not limited thereto.

The second lighting unit 50 may be disposed in the second case 12. The second lighting unit 50 may be turned on and off in its entirety or in sections. Illuminance and color of the second lightning unit 50 may be controlled in response to control signals from the control unit 93. The second lighting unit 50 may enable a user to visually recognize a target value into which a state of the cooking utensil is changed.

The second lighting unit 50 may be arranged along at least a portion of a predetermined boundary that surrounds the display unit 90. More specifically, the second lighting unit 50 may emit light in the upward direction of the second case 12.

The second lighting unit 50 may include second light sources 51 and a second diffuser 52 for diffusing and radiating light incident from the second light sources 51. The second light sources 51 may be embodied as the above-described LEDs. The second light sources 51 may be disposed inside the second case 12. The second light sources 51 may be arranged at a constant pitch along a predetermined boundary that surrounds the display unit 90 when viewed from above.

The second diffuser 52 may be disposed at a top surface of the second case 12 in order to diffuse light incident from the second light sources 51 in the horizontal direction and to radiate the same in the upward direction. More specifically, the second diffuser 52 may be disposed along the boundary that surrounds the display unit 90 when viewed from above. That is, the second diffuser 52 may be formed in an annular shape. The second diffuser 52 may be configured as a unitary member or as a plurality of members.

The second diffuser 52 may function to uniformly distribute brightness of incident light, to convert incident point light into surface light, and to radiate the surface light in the upward direction of the second case 12. For example, the second diffuser 52 may have a hollow metal tube configuration exhibiting transparence such that light propagates internally therewithin. More specifically, the second diffuser 52 may be in a flat type or a wedge type using polymethylmethacrylate (PMMA) or a transparent acrylic resin material. Alternatively, the second diffuser 52 may include a lens made of a glass or plastic material; however, the second diffuser 52 is not limited thereto.

The third lighting unit 60 may emit visually perceivable light. The third lighting unit 60 may be disposed between the first lighting unit 40 and the second lighting unit 50. The third lighting unit 60 may be connected with the first lighting unit 40 and the second lighting unit 50, or the third lightning unit 60 may be disposed closely adjacent to the first lighting unit 40 and the second lighting unit 50 therebetween.

The third lighting unit 60 may be disposed in the third case 13. The third lighting unit 60 may be turned on and off in its entirety or in sections. Illuminance and color of the third lightning unit 60 may be controlled in response to control signals from the control unit 93. The third lighting unit 60 may enable a user to visually recognize that a state of the cooking utensil has been completely changed into a target value.

The third lighting unit 60 may be disposed along a predetermined line that connects the first lighting unit 40 and the second lighting unit 50. More specifically, the third lighting unit 60 may emit light in the upward direction of the third case 13.

The third lighting unit 60 may include a third light source 61 and a third diffuser 62 for diffusing and radiating light incident from the third light source 61. The third light source 61 may be embodied as the above-described LED. The third light source 61 may be disposed inside the third case 13.

The third diffuser 62 may be disposed at the top surface of the third case 13 in order to diffuse light incident from the third light source 61 in the horizontal direction and to radiate the same in the upward direction. More specifically, the third diffuser 62 may be disposed in the form of a line when viewed from above. The third diffuser 62 may be configured as a unitary member or as a plurality of members.

The third diffuser 62 may function to uniformly distribute brightness of incident light, to convert incident point light into surface light, and to radiate the surface light in the upward direction of the third case 13. For example, the third diffuser 62 may have a hollow metal tube configuration exhibiting transparence such that light propagates internally therewithin. More specifically, the third diffuser 62 may be in a flat type or a wedge type using polymethylmethacrylate (PMMA) or a transparent acrylic resin material. Alternatively, the third diffuser 62 may include a lens made of a glass or plastic material; however, the third diffuser 62 is not limited thereto.

The sensor unit 20 (or sensor device) may include at least one of the temperature sensor 21, the detection sensor 22 and the pressure sensor 23. The sensor unit 20 may be formed in a single module configuration into which the temperature sensor 21, the detection sensor 22 and the pressure sensor 23 are integrated.

The sensor unit 20 may be located at (or in) the top surface of the case 10, on which a cooking utensil is provided, in order to easily detect a state of the cooking utensil. The sensor unit 20 may be disposed at a position of the top surface of the first case 11 that overlaps the working coil 70 in the vertical direction.

The temperature sensor 21 may measure (or determine) the temperature of the cooking utensil, and may transmit the measured value to the control unit 93.

The detection sensor 22 may detect (or determine) whether the cooking utensil is located on the case 10, and may transmit the detected value to the control unit 93. The detection sensor 22 may include an illuminance sensor or a proximity sensor.

The illuminance sensor may detect brightness of the region above the first case 11 and transmit the detected value of the brightness to the control unit 93. The control unit 93 may determine whether the cooking utensil is present on the first case 11 based on the detected value of the brightness transmitted from the illuminance sensor.

The proximity sensor may detect a cooking utensil when the cooking utensil is brought close to the top surface of the first case 11, and may transmit the result of the detection to the control unit 93. The proximity sensor is a sensor that is configured to detect an object when the object is proximately approaching a certain detection surface or to detect the presence or absence of an object in the proximity of a certain detection surface using electromagnetic force or infrared rays without physical contact. Examples of the proximity sensor include a transmission-type photoelectric sensor, a direct reflection-type photoelectric sensor, a mirror reflection-type photoelectric sensor, a radio frequency oscillation-type proximity sensor, an electrostatic capacitance-type proximity sensor, a magnetic proximity sensor, an infrared proximity sensor, and/or the like. The control unit 93 may determine whether the cooking utensil is present on the first case 11 based on the result of the detection transmitted from the proximity sensor.

The pressure sensor 23 may measure the pressure applied to the top surface of the first case 11, and transmit the measured value of the pressure to the control unit 93. The control unit 93 may determine whether a cooking utensil is present on the first case 11 based on the measured value of the pressure transmitted from the pressure sensor 23.

The display unit 90 may display visually perceivable information about the induction heating device 1. The display unit 90 may be a display device for outputting text or images. The display unit 90 may output text or images corresponding to information about a temperature, a weight, a cooking utensil, etc. in response to control signals from the control unit 93.

A command input unit 91 may receive user commands, convert the user commands into command signals, and transmit the command signals to the control unit 93. The control unit 93 may control the induction heating device 1 in response to the command signals. The command input unit 91 may include physical input members, such as buttons, touch sensors, dials, etc., to receive user commands. The command input unit 91 may include a touch panel, which is formed in a layer structure that overlaps the display unit 90 and that acts as a touch screen, whereby a user can input commands by touching the touch screen.

The control unit 93 may control overall operation of the induction heating device 1.

The control unit 93 may control the first lighting unit 40 based on the temperature of the cooking utensil transmitted from the temperature sensor 21. The control unit 93 may control the first lighting unit 40 relative to the second lighting unit 50 based on temperature of the cooking utensil transmitted from the temperature sensor 21.

When the temperature of the cooking utensil is equal to the set temperature, the control unit 93 may perform control such that illuminance of the first lighting unit 40 becomes equal to that of the second lighting unit 50. The set temperature may be a value that was stored in advance in memory, or the set temperature may be a value that the user sets through the command input unit 91. When the temperature of the cooking utensil is equal to the set temperature, the control unit 93 may make the illuminance of the first lighting unit 40 and the illuminance of the second lighting unit 50 equal to each other, thereby enabling the user to visually and intuitively recognize the degree to which the cooking utensil is heated. As used hereinafter, "equal" may not be limited to a mathematically perfect equal state between the illuminance of the first lighting unit 40 and the illuminance of the second lighting unit 50, but may include a substantially equal state that falls within a predetermined error range in accordance with an engineering concept. The embodiment may further include an illuminance sensor for measuring illuminance of the first lighting unit 40 and illuminance of the second lighting unit 50.

The control unit 93 may control color or illuminance of the second lighting unit 50 based on the set temperature transmitted from the command input unit 91. More specifically, the control unit 93 may output a control signal for adjusting illuminance of the second lighting unit 50 in proportion to the set temperature transmitted from the command input unit 91. That is, as the set temperature transmitted from the command input unit 91 increases, the control unit 93 performs control such that the second lighting unit 50 has a higher illuminance. The control unit 93 may output a control signal for adjusting color of the light emitted from the second lighting unit 50 in proportion to the set temperature transmitted from the command input unit 91. That is, as the set temperature transmitted from the command input unit 91 increases, the control unit 93 may perform control such that the light emitted from the second lighting unit 50 has a color coordinate value that is closer to red.

When temperature of the cooking utensil has a value between the set temperature and the initial temperature, the control unit 93 may perform control such that the first lighting unit 40 has an illuminance value between illuminance of the first lighting unit 40 corresponding to the initial temperature and illuminance of the second lighting unit 50. The control unit 93 may determine whether the temperature of the cooking utensil has a value between the set temperature and the initial temperature based on the measured value of the temperature transmitted from the temperature sensor 21. Upon determining that the temperature of the cooking utensil has a value between the set temperature and the initial temperature, the control unit 93 may output a control signal such that the first lighting unit 40 has an illuminance value between the illuminance of the first lighting unit 40 corresponding to the initial temperature and the illuminance of the second lighting unit 50. The initial temperature may be a value that is lower than the set temperature. When the temperature of the cooking utensil is equal to the initial temperature, the control unit 93 may perform control such that the first lighting unit 40 has an illuminance corresponding to the initial temperature. The illuminance corresponding to the initial temperature may be lower than the illuminance corresponding to the set temperature. Further, when the temperature of the cooking utensil has a value between the set temperature and the initial temperature, the control unit 93 may perform control such that the difference between the illuminance of the first lighting unit 40 and the illuminance of the second lighting unit 50 is proportional to the difference between the set temperature and the temperature of the cooking utensil. That is, as the temperature of the cooking utensil more closely approaches the set temperature, the control unit 93 may gradually change the illuminance of the first lighting unit 40 such that it becomes equal to the illuminance of the second lighting unit 50.

In another example, when the temperature of the cooking utensil is equal to the set temperature, the control unit 93 may perform control such that the light from the first lighting unit 40 and the light from the second lighting unit 50 have a same color. When the temperature of the cooking utensil is equal to the set temperature, the control unit 93 may make the color of the light from the first lighting unit 40 and the color of the light from the second lighting unit 50 equal to each other, thereby enabling the user to visually and intuitively recognize a degree to which the cooking utensil is heated. The equal state, in which the light from the first lighting unit 40 and the light from the second lighting unit 50 have the same color, may refer to an equal state in which the color coordinate value of the first lighting unit 40 and the color coordinate value of the second lighting unit 50 are the same within a predetermined range. The equal state in which the light from the first lighting unit 40 and the light from the second lighting unit 50 have the same color is not limited to a mathematically perfect equal state, but may include a substantially equal state that falls within a predetermined error range in accordance with an engineering concept.

When the temperature of the cooking utensil has a value between the set temperature and the initial temperature, the control unit 93 may perform control such that the light from the first lighting unit 40 has a color representing a mixture of the color of the light from the first lighting unit 40 corresponding to the initial temperature and the color of the light from the second lighting unit 50. The mixed color may be a color generated by the combination of colored light.

The control unit 93 may determine whether the temperature of the cooking utensil has a value between the set temperature and the initial temperature based on the measured value of the temperature transmitted from the temperature sensor 21 (and/or sensed by the temperature sensor 21). Upon determining that the temperature of the cooking utensil has a value between the set temperature and the initial temperature, the control unit 93 may output a control signal such that the first lighting unit 40 has a color coordinate value between the color coordinate value of the first lighting unit 40 corresponding to the initial temperature and the color coordinate value of the second lighting unit 50. When the temperature of the cooking utensil is equal to the initial temperature, the control unit 93 may perform control such that the first lighting unit 40 has a color coordinate value corresponding to the initial temperature. When the temperature of the cooking utensil has a value between the set temperature and the initial temperature, the control unit 93 may perform control such that the difference between the color coordinate value of the first lighting unit 40 and the color coordinate value of the second lighting unit 50 is proportional to the difference between the set temperature and the temperature of the cooking utensil. That is, as the temperature of the cooking utensil more closely approaches the set temperature, the control unit 93 may gradually change the color of the light from the first lighting unit 40 such that it becomes equal to the color of the light from the second lighting unit 50.

The control unit 93 may perform control such that the illuminance of the first lighting unit 40 varies depending on the temperature of the cooking utensil. As the temperature of the cooking utensil increases, the control unit 93 may increase the illuminance of the first lighting unit 40.

The control unit 93 may perform control such that the color of the light from the first lighting unit 40 varies depending on the temperature of the cooking utensil. As the temperature of the cooking utensil increases, the control unit 93 may change the color of the light from the first lighting unit 40 such that it becomes closer to red.

The control unit 93 may change an operational state of the first lighting unit 40 in response to the detection signals transmitted from the detection sensor 22. Based on the detection signals transmitted from the detection sensor 22, the control unit 93 may determine presence or absence of the cooking utensil, and upon determining that the cooking utensil is present, the control unit 93 may turn on the first lighting unit 40, change the illuminance or the color of the light from the first lighting unit 40, and/or change the on-region of the first lighting unit 40.

The control unit 93 may change the operational state of the first lighting unit 40 depending on a change in weight of the cooking utensil. Based on the pressure signals transmitted from the pressure sensor 23, the control unit 93 may determine the change in the weight of the cooking utensil, and upon determining that the weight of the cooking utensil has been changed, the control unit 93 may turn on the first lighting unit 40, change the illuminance or the color of the light from the first lighting unit 40, and/or change the on-region of the first lighting unit 40.

In a further example, when the temperature of the cooking utensil is equal to the set temperature, the control unit 93 may perform control such that the third lighting unit 60 is turned on. At this time, the control unit 93 may perform control such that illuminance or the color coordinate value of the turned-on third lighting unit 60 becomes equal to that of the second lighting unit 50.

Figure 4:
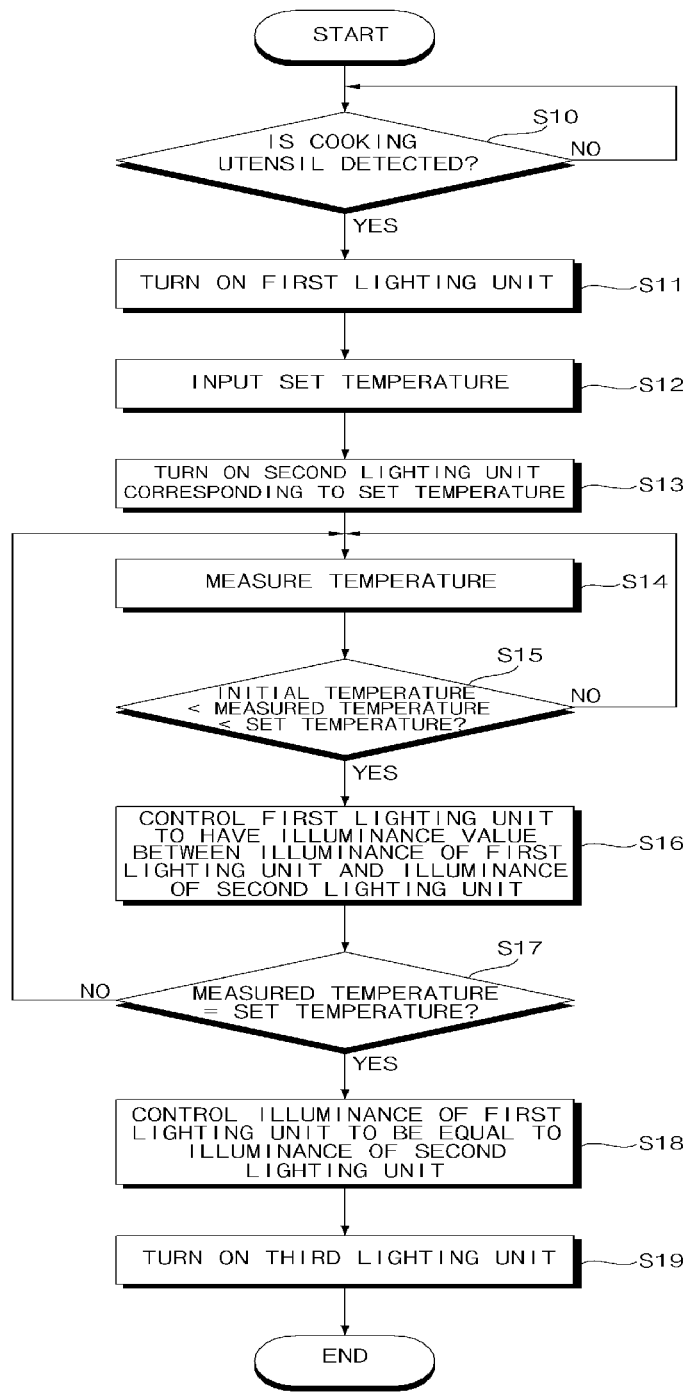
FIG. 4 is a flowchart illustrating a method of controlling an induction heating device according to an example embodiment.

FIG. 4 is a flowchart illustrating a method of controlling an induction heating device according to an example embodiment. FIG. 5 is a view illustrating operation of an induction heating device in accordance with the control method according to an example embodiment. Other embodiments and configurations may also be provided.

Referring to FIGS. 4 and 5, a method of controlling the induction heating device 1 may include detecting a cooking utensil (S10), turning on the first lighting unit 40 when the cooking utensil is detected (S11), and turning on the second lighting unit 50 such that the second lighting unit 50 has an illuminance corresponding to the set temperature (S13). The method may also include detecting the temperature of the cooking utensil (S14), and performing control such that, as a difference between the temperature of the cooking utensil and the set temperature decreases, the illuminance of the first lighting unit 40 becomes closer to the illuminance of the second lighting unit 50 (S15, S16, S17 and S18).

The method of controlling the induction heating device may be as follows.

In the detecting of the cooking utensil (S10), the detection sensor 22 may detect presence or absence of the cooking utensil and transmit the detection signal to the control unit 93.

Figure 5A:
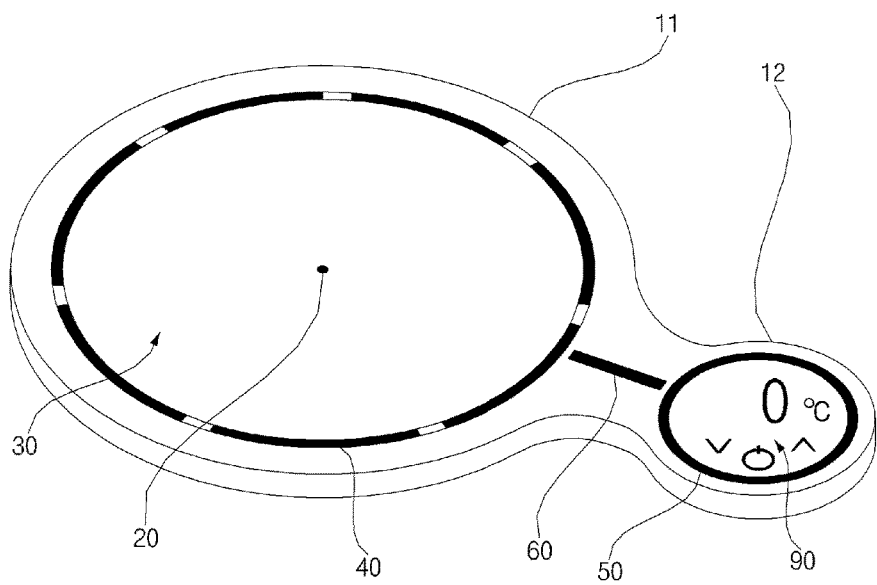
FIGS. 5a, 5b, 5c, 5d and 5e illustrate operation of an induction heating device in accordance with the control method according to an example embodiment.

Referring to FIG. 5a, when no cooking utensil is detected, the control unit 93 may perform control such that the first lighting unit 40 is turned off or such that the first lighting unit 40 is turned on in sections.

Figure 5B:
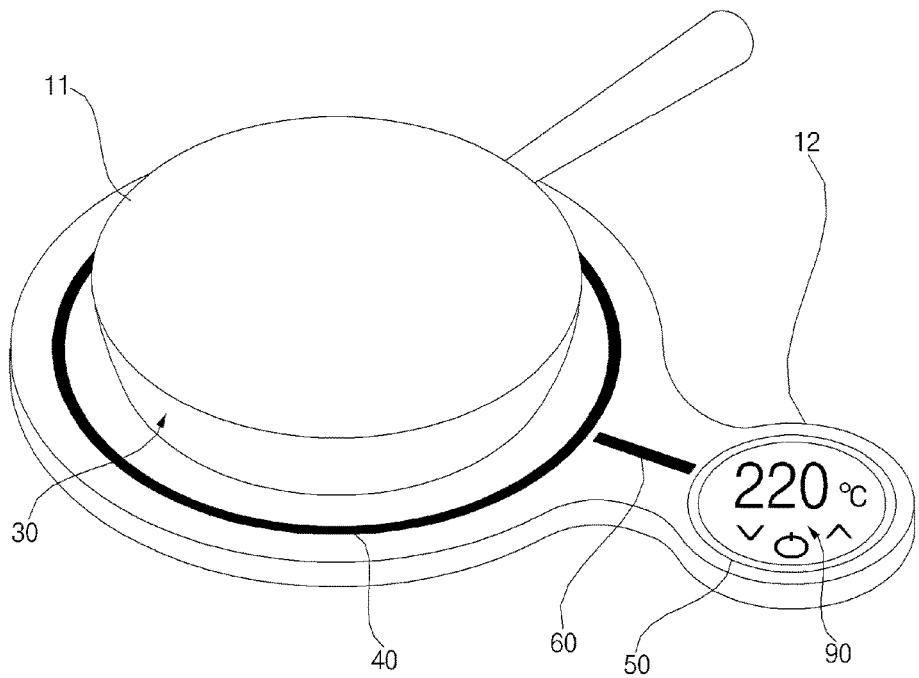

Referring to FIG. 5b, when it is detected that a cooking utensil is present on the first case 11, the control unit 93 may perform control such that the first lighting unit 40 is turned on (S11). At this time, the control unit 93 may designate an illuminance corresponding to the initial temperature of the cooking utensil as the illuminance of the first lighting unit 40. The illuminance corresponding to the initial temperature may be a preset value.

In the turning on of the second lighting unit 50 such that it has an illuminance corresponding to the set temperature (S13), the control unit 93 may turn on the second lighting unit 50 such that it has an illuminance proportional to the set temperature. The set temperature may be a value that was stored in advance in memory or may be a value that the user sets through the command input unit 91. Based on the set temperature transmitted from the command input unit 91, the control unit 93 may control the illuminance of the second lighting unit 50 (S12 and S13). More specifically, as the set temperature transmitted from the command input unit 91 increases, the control unit 93 may perform control such that the illuminance of the second lighting unit 50 becomes higher.

In the detecting of the temperature of the cooking utensil (S14), the temperature sensor 21 may detect the temperature of the cooking utensil and transmit the detected value to the control unit 93.

The control unit 93 may control the first lighting unit 40 based on the temperature of the cooking utensil.

As the difference between the temperature of the cooking utensil and the set temperature decreases, the control unit 93 may perform control such that the illuminance of the first lighting unit 40 becomes closer to the illuminance of the second lighting unit 50.

Figure 5C:
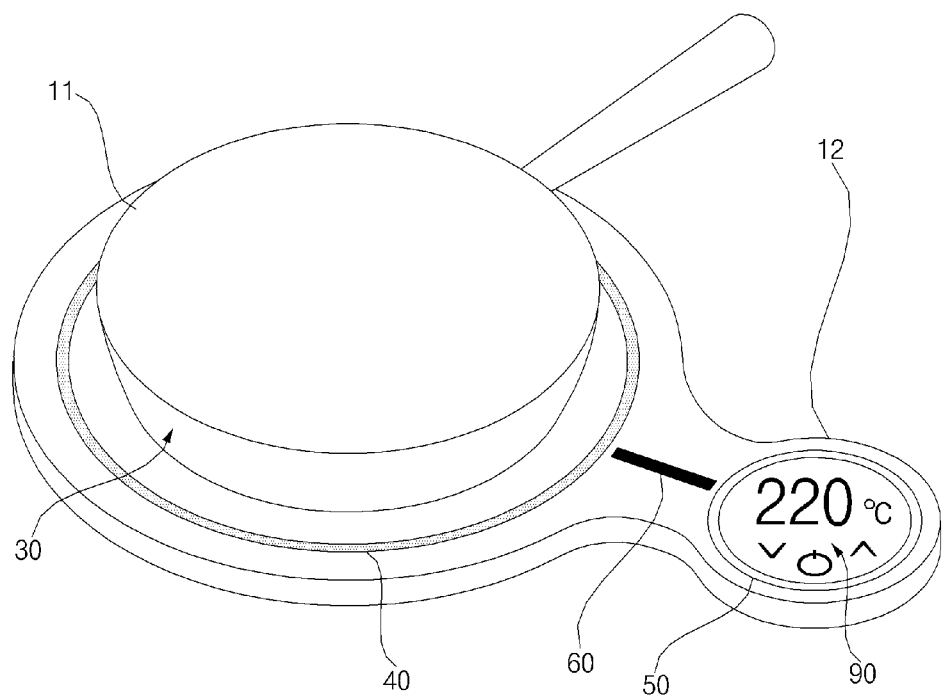
Figure 5D:
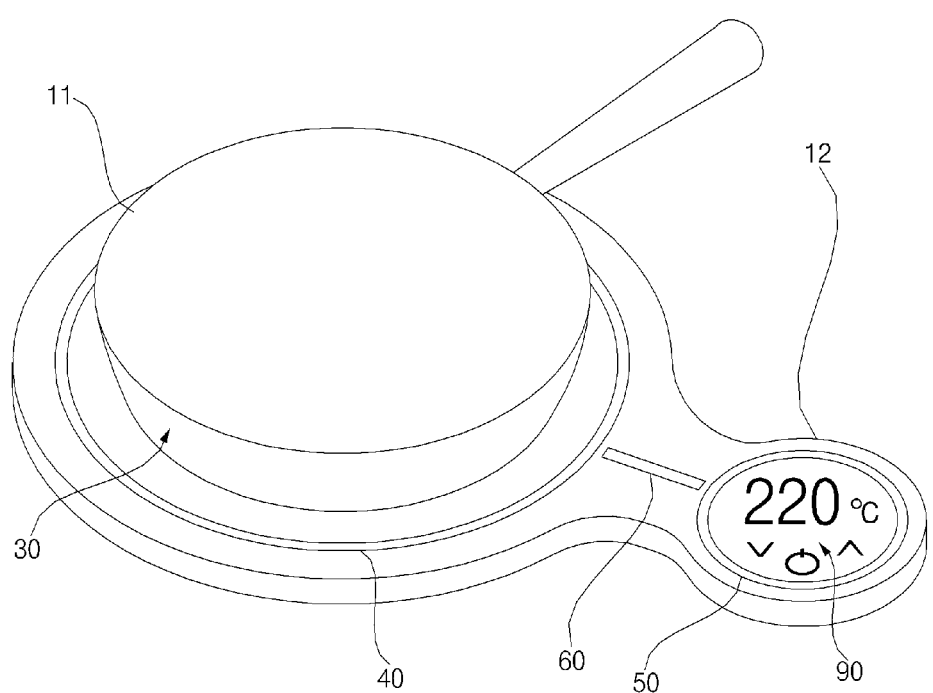
Figure 5E:
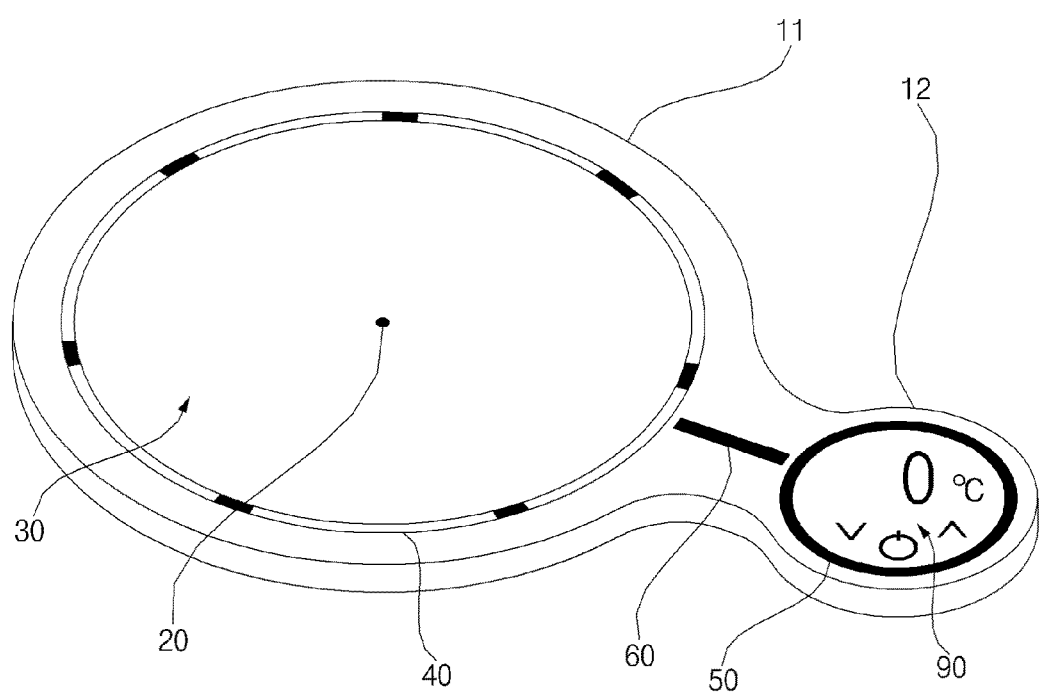

Referring to FIGS. 5c and 5d, as the difference between the temperature of the cooking utensil and the set temperature decreases, the control unit 93 may perform control such that the illuminance of the first lighting unit 40 becomes closer to the illuminance of the second lighting unit 50, and when the set temperature and the temperature of the cooking utensil finally become equal to each other, the control unit 93 may perform control such that the illuminance of the first lighting unit 40 becomes equal to the illuminance of the second lighting unit 50.

More specifically, when the temperature of the cooking utensil has a value between the set temperature and the initial temperature, the control unit 93 may perform control such that the first lighting unit 40 has an illuminance value between the illuminance of the first lighting unit 40 corresponding to the initial temperature and the illuminance of the second lighting unit 50 (S15 and S16). When the temperature of the cooking utensil is equal to the set temperature, the control unit 93 may perform control such that the illuminance of the first lighting unit 40 becomes equal to that of the second lighting unit 50 (S17 and S18). The state in which the temperature of the cooking utensil is equal to the set temperature is not limited to a mathematically perfect equal state, but may include a substantially equal state that falls within a predetermined error range in accordance with an engineering concept.

When the temperature of the cooking utensil is equal to the set temperature, the control unit 93 may perform control such that the third lighting unit 60 is turned on (S19). At this time, the control unit 93 may perform control such that the illuminance of the turned-on third lighting unit 60 becomes equal to that of the second lighting unit 50.

When no cooking utensil is detected and the temperature of the region on the first case 11 exceeds a reference temperature, the control unit 93 may change the operational state of the first lighting unit 40. More specifically, when no cooking utensil is detected and the temperature of the region on the first case 11 exceeds a reference temperature, the control unit 93 may change at least one of the illuminance, the color of light and the on-region of the first lighting unit 40. The temperature of the region on the first case 11 may be measured by the temperature sensor 21.

Figure 6:
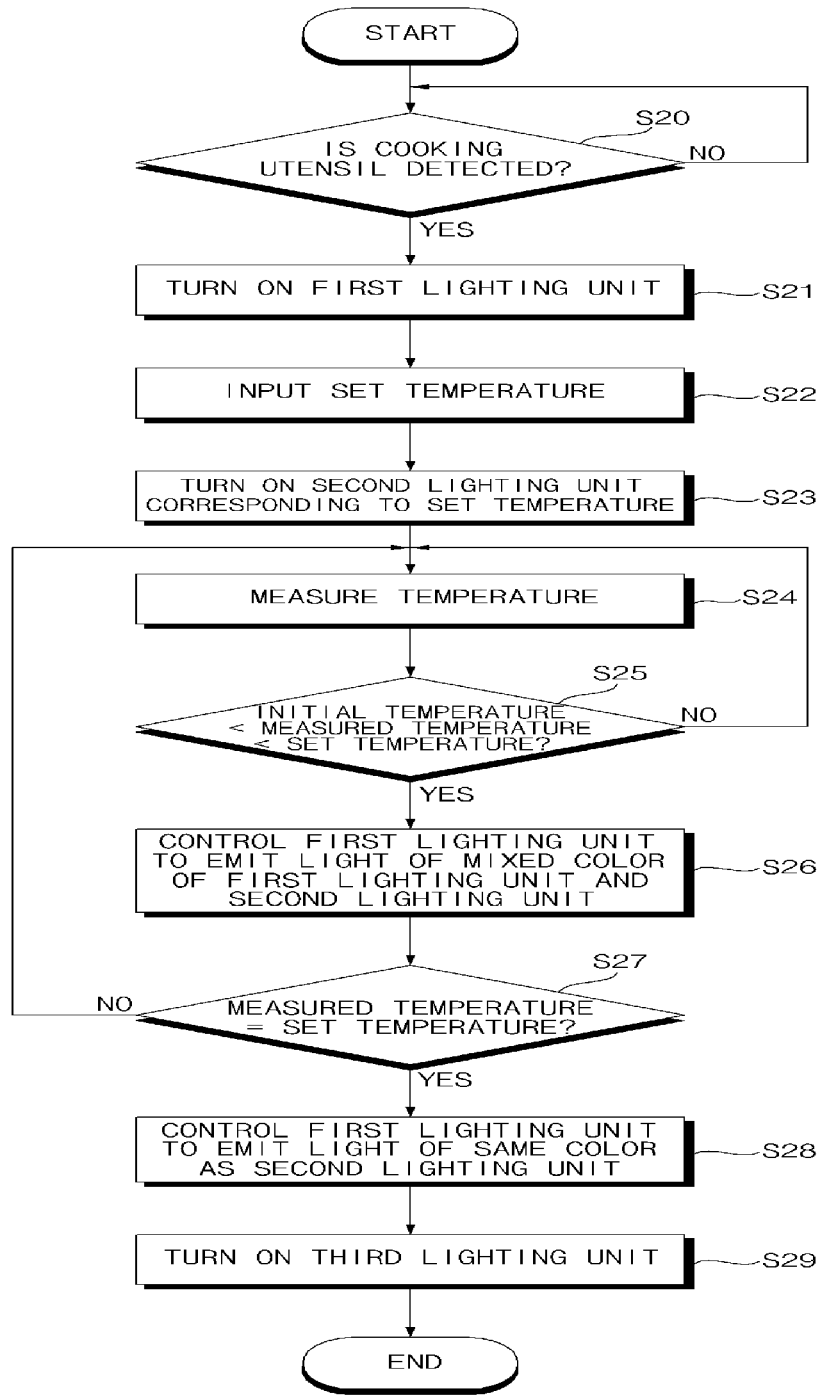
FIG. 6 is a flowchart illustrating a method of controlling an induction heating device according to an example embodiment.

FIG. 6 is a flowchart illustrating a method of controlling an induction heating device according to an example embodiment. FIG. 7 is a view illustrating operation of an induction heating device in accordance with the control method according to an example embodiment. Other embodiments and configurations may also be provided.

Referring to FIGS. 6 and 7, a method of controlling the induction heating device 1 may include detecting a cooking utensil (S20), turning on the first lighting unit 40 when the cooking utensil is detected (S21), turning on the second lighting unit 50 such that the light from the second lighting unit 50 has a color corresponding to the set temperature (S23), detecting the temperature of the cooking utensil (S24), and performing control such that, as a difference between the temperature of the cooking utensil and the set temperature decreases, the color coordinate value of the first lighting unit 40 becomes closer to the color coordinate value of the second lighting unit 50 (S25, S26, S27 and S28).

The method of controlling the induction heating device may be as follows.

In the detecting of the cooking utensil (S20), the detection sensor 22 may detect the presence or absence of the cooking utensil and transmit the detection signal to the control unit 93.

Figure 7A:
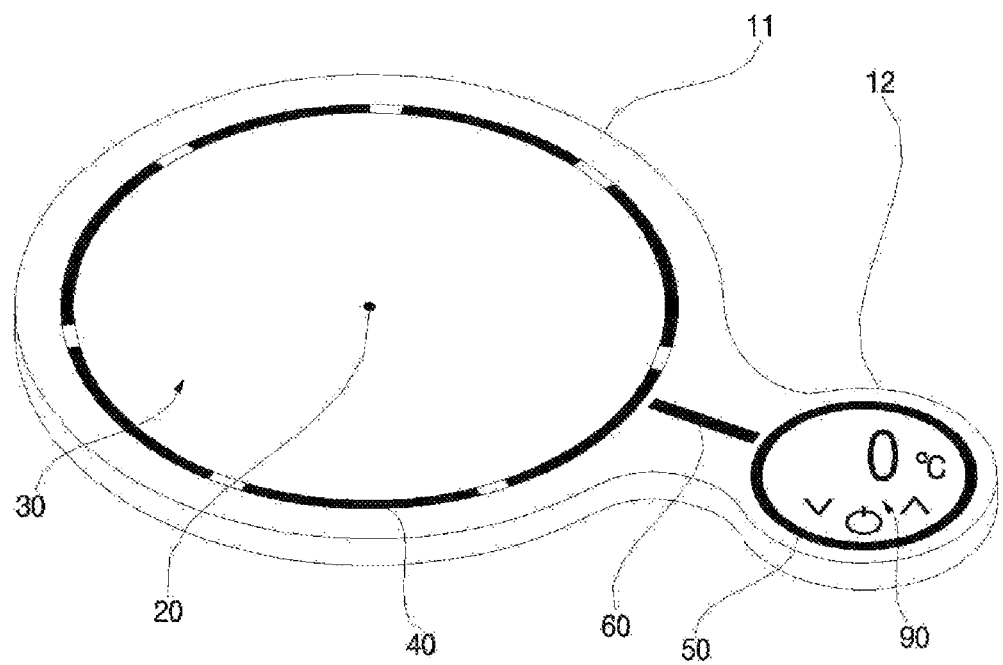
FIGS. 7a, 7b, 7c, 7d and 7e illustrate operation of an induction heating device in accordance with a control method according to an example embodiment.

Referring to FIG. 7a, when no cooking utensil is detected, the control unit 93 may perform control such that the first lighting unit 40 is turned off or such that the first lighting unit 40 is turned on in sections.

Figure 7B:
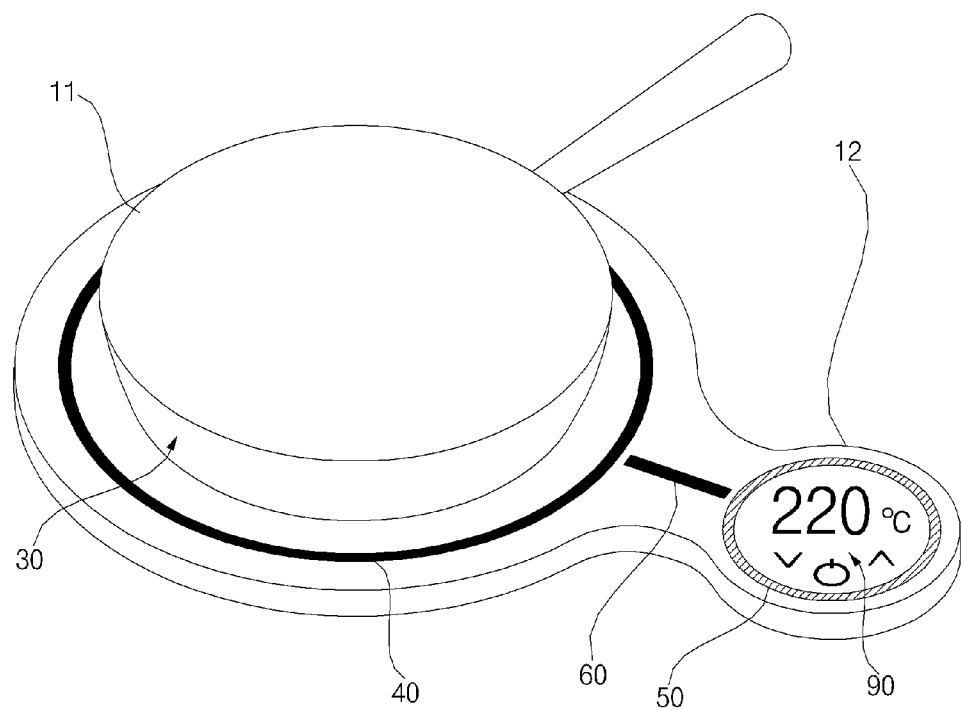

Referring to FIG. 7b, when it is detected that the cooking utensil is provided on the first case 11, the control unit 93 may perform control such that the first lighting unit 40 is turned on (S21). At this time, the control unit 93 may designate a color coordinate value corresponding to the initial temperature of the cooking utensil as the color coordinate value of the first lighting unit 40. The color coordinate value corresponding to the initial temperature may be a preset value.

In the turning on of the second lighting unit 50 such that the light therefrom has a color corresponding to the set temperature, the control unit 93 may turn on the second lighting unit 50 such that the light therefrom has a color coordinate value proportional to the set temperature. The set temperature may be a value that was stored in advance in memory or may be a value that the user sets through the command input unit 91. Based on the set temperature transmitted from the command input unit 91, the control unit 93 may control the color of the light from the second lighting unit 50. More specifically, as the set temperature transmitted from the command input unit 91 increases, the control unit 93 may perform control such that the second lighting unit 50 has a color coordinate value that is closer to red (S22 and S23).

In the detecting of the temperature of the cooking utensil (S24), the temperature sensor 21 may detect the temperature of the cooking utensil and transmit the detected value to the control unit 93.

The control unit 93 may control the first lighting unit 40 based on the temperature of the cooking utensil (S25, S26, S27 and S28).

As the difference between the temperature of the cooking utensil and the set temperature decreases, the control unit 93 may perform control such that the color coordinate value of the first lighting unit 40 becomes closer to the color coordinate value of the second lighting unit 50.

Figure 7C:
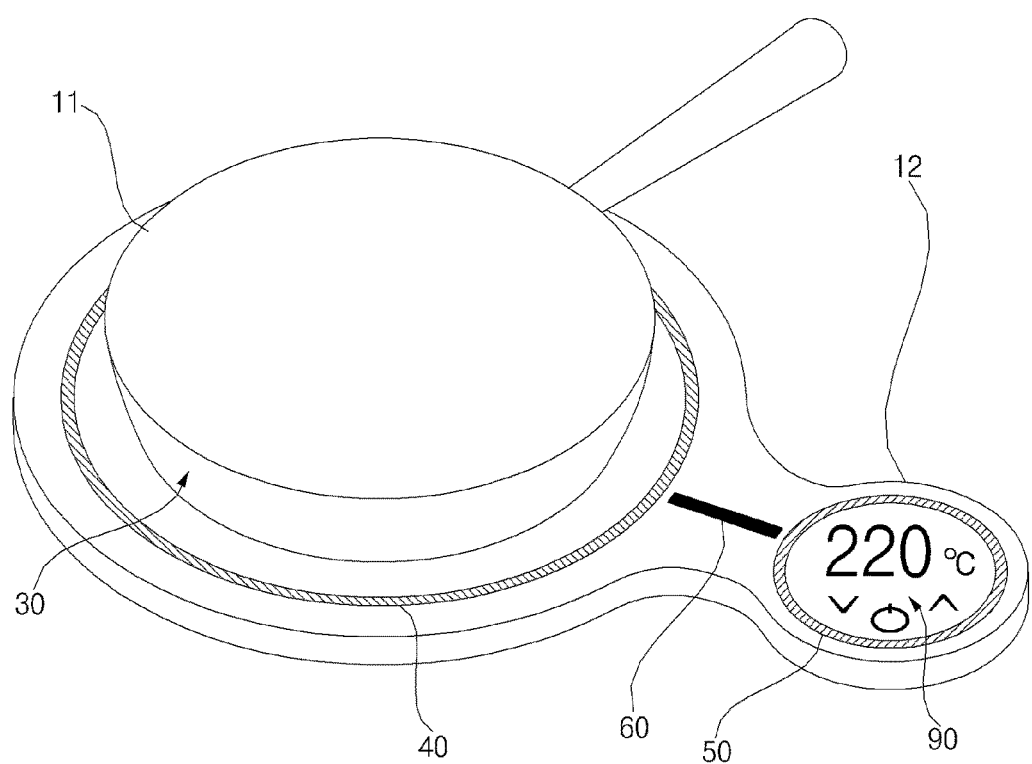
Figure 7D:
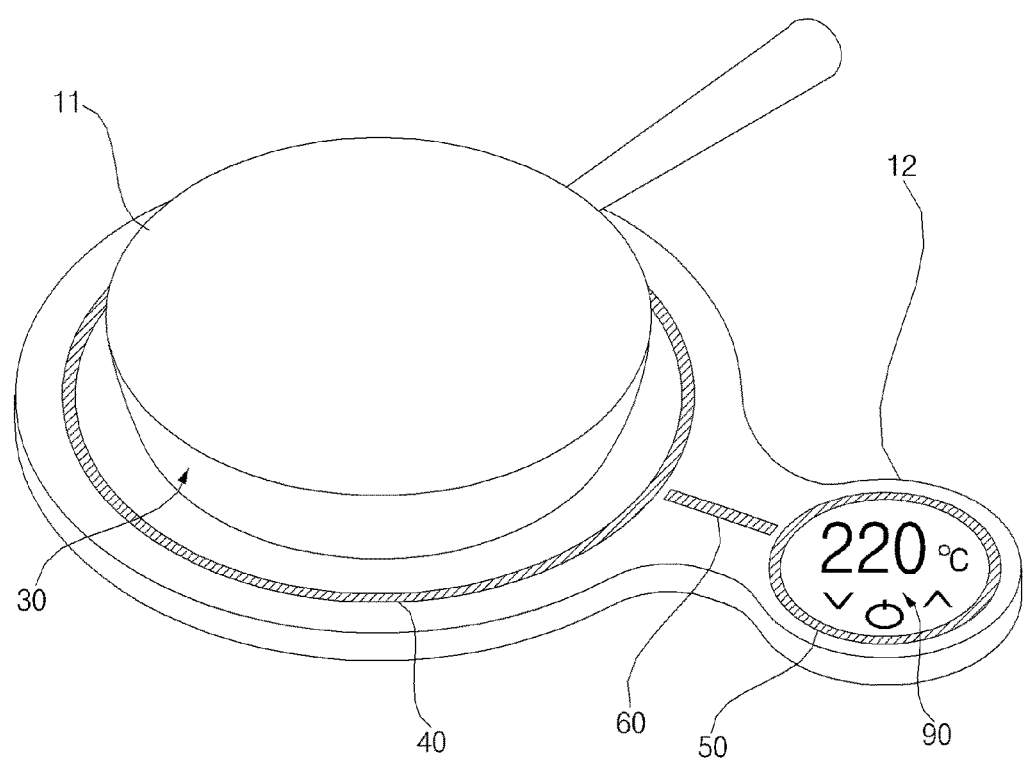
Figure 7E:
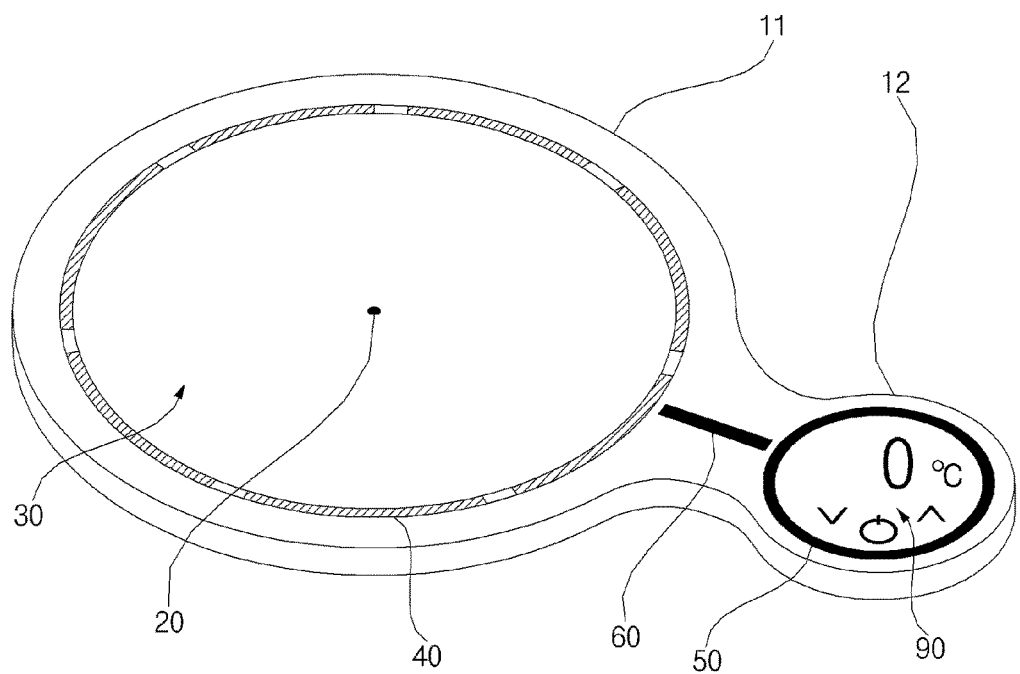

Referring to FIGS. 7c and 7d, as the difference between the temperature of the cooking utensil and the set temperature decreases, the control unit 93 may perform control such that the color coordinate value of the first lighting unit 40 becomes closer to the color coordinate value of the second lighting unit 50, and when the set temperature and the temperature of the cooking utensil become finally equal to each other, the control unit 93 may perform control such that the color coordinate value of the first lighting unit 40 becomes equal to the color coordinate value of the second lighting unit 50.

More specifically, when the temperature of the cooking utensil has a value between the set temperature and the initial temperature, the control unit 93 may perform control such that the first lighting unit 40 has a color coordinate value between the color coordinate value of the first lighting unit 40 corresponding to the initial temperature and the color coordinate value of the second lighting unit 50 (S25). When the temperature of the cooking utensil is equal to the set temperature, the control unit 93 may perform control such that the color coordinate value of the first lighting unit 40 becomes equal to that of the second lighting unit 50 (S28). The state in which the temperature of the cooking utensil is equal to the set temperature is not limited to a mathematically perfect equal state, but may include a substantially equal state that falls within a predetermined error range in accordance with an engineering concept.

When the temperature of the cooking utensil is equal to the set temperature, the control unit 93 may perform control such that the third lighting unit 60 is turned on (S29). At this time, the control unit 93 may perform control such that the color coordinate value of the turned-on third lighting unit 60 becomes equal to that of the second lighting unit 50.

When no cooking utensil is detected and the temperature of the region on the first case 11 exceeds a reference temperature, the control unit 93 may change the operational state of the first lighting unit 40. More specifically, when no cooking utensil is detected and the temperature of the region on the first case 11 exceeds a reference temperature, the control unit 93 may change at least one of the color of light, the illuminance and the on-region of the first lighting unit 40. The temperature of the region on the first case 11 may be measured by the temperature sensor 21.

As is apparent from the above description, embodiments may provide an induction heating device and a method of controlling the same, in which, when the temperature of the cooking utensil is equal to the set temperature, the control process is performed such that color or illuminance of the first lighting unit becomes equal to the color or the illuminance of the second lighting unit, thereby enabling a user to visually and intuitively recognize a degree to which the cooking utensil is heated.

The user may be capable of visually recognizing the change in the state of the cooking utensil based on the change in the state of the first lighting unit.

An object of the present disclosure is to provide an induction heating device that enables a user to intuitively and visually recognize information about a temperature and a weight of a cooking utensil, etc., and thus to easily control the induction heating device.

However, objects are not limited to the above-mentioned object, and other objects not mentioned may be clearly understood by those skilled in the art from the following description.

In accordance with the present disclosure, the above and other objects can be accomplished by an induction heating device including a working coil, a power supply unit, a temperature sensor, a first lightning unit, a second lightning unit and a control unit. The working coil may be for creating a magnetic field for induction of eddy current in a cooking utensil so as to heat the cooking utensil. The power supply unit may be for providing an induction voltage to operate the working coil. The temperature sensor may be for measuring a temperature of the cooking utensil. The first lighting unit may be for emitting visually perceivable light. The second lighting unit may be for emitting visually perceivable light. The control unit may be for controlling the first lighting unit based on the temperature of the cooking utensil transmitted from the temperature sensor.

Effects of embodiments are not limited to the above-mentioned effects, and other effects not mentioned may be clearly understood by those skilled in the art from the accompanying claims.

The above described features, configurations, effects, and the like are included in at least one of the embodiments, and should not be limited to only one embodiment. In addition, the features, configurations, effects, and the like as illustrated in each embodiment may be implemented with regard to other embodiments as they are combined with one another or modified by those skilled in the art. Thus, content related to these combinations and modifications should be construed as being included in the scope and spirit of embodiments as disclosed in the accompanying claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An induction heating device comprising:
    a working coil to provide a magnetic field for induction of an eddy current at a cooking utensil;
    a power supply to provide an induction voltage for the working coil;
    a temperature sensor to sense a temperature of the cooking utensil;
    a first lighting unit to emit a visually perceivable light;
    a second lighting unit to emit a visually perceivable light; and
    a controller for controlling the first lighting unit based on the temperature of the cooking utensil sensed by the temperature sensor,
    wherein when the temperature of the cooking utensil is equal to a set temperature, the controller is configured to perform control such that the first lighting unit and the second lighting unit emit light of a same color,
    wherein when the temperature of the cooking utensil has a value between a set temperature and an initial temperature, the controller is configured to perform control such that the first lighting unit emits light of a color representing a mixture of a color of light from the first lighting unit corresponding to the initial temperature and a color of light from the second lighting unit.

2. The induction heating device according to claim 1, wherein when the sensed temperature of the cooking utensil is equal to a set temperature, the controller to perform control such that the first lighting unit and the second lighting unit have a same illuminance.

3. The induction heating device according to claim 1, wherein when the sensed temperature of the cooking utensil has a value between a set temperature and an initial temperature, the controller performs control such that the first lighting unit has an illuminance value between an illuminance of the first lighting unit corresponding to the initial temperature and an illuminance of the second lighting unit.

4. The induction heating device according to claim 1, wherein the controller to perform control such that illuminance of the first lighting unit varies depending on the sensed temperature of the cooking utensil.

5. The induction heating device according to claim 1, wherein the controller to perform control such that color of the first lighting unit varies depending on the sensed temperature of the cooking utensil.

6. The induction heating device according to claim 1, wherein the controller to control an illuminance of the second lighting unit to correspond to a set temperature.

7. The induction heating device according to claim 1, wherein the controller to control a color of light from the second lighting unit to correspond to a set temperature.

8. The induction heating device according to claim 1, further comprising:
    a command input unit to receive a user command,
    wherein the controller controls a color of light or an illuminance of the second lighting unit based on a set temperature transmitted from the command input unit.

9. The induction heating device according to claim 1, further comprising:
    a detection sensor to detect the cooking utensil,
    wherein the controller changes an operational state of the first lighting unit based on a detection signal received from the detection sensor.

10. The induction heating device according to claim 1, further comprising:
    a display to display information regarding the induction heating device.

11. The induction heating device according to claim 10, wherein the first lighting unit is arranged along at least a portion of a predetermined boundary that surrounds the working coil.

12. The induction heating device according to claim 10, wherein the second lighting unit is arranged along at least a portion of a predetermined boundary that surrounds the display.

13. The induction heating device according to claim 1, further comprising:
    a pressure sensor to detect a weight of the cooking utensil,
    wherein the controller changes an operational state of the first lighting unit based on a change in the weight of the cooking utensil.

14. The induction heating device according to claim 1, further comprising:
    a third lighting unit for emitting visually perceivable light, the third lighting unit being disposed between the first lighting unit and the second lighting unit,
    wherein when the temperature of the cooking utensil is equal to a set temperature, the controller performs control such that the third lighting unit is turned on.

15. The induction heating device according to claim 14, wherein the controller to perform control such that the third lighting unit and the first lighting unit have a same illuminance.

16. The induction heating device according to claim 1, wherein the power supply includes a wireless charging receiver to generate power through electromagnetic induction with an external wireless charging transmitter.

17. A method of controlling an induction heating device, comprising:
    detecting a cooking utensil on the induction heating device;
    turning on a first lighting unit of the induction heating device when the cooking utensil is detected;
    turning on a second lighting unit of the induction heating device such that the second lighting unit has an illuminance corresponding to a set temperature;
    detecting a temperature of the cooking utensil; and
    performing control such that as a difference between the temperature of the cooking utensil and the set temperature decreases, the first lighting unit is to have an illuminance that is closer to the illuminance of the second lighting unit.

18. A method of controlling an induction heating device, comprising:
    detecting a cooking utensil of the induction heating device;
    turning on a first lighting unit of the induction heating device when the cooking utensil is detected;
    turning on a second lighting unit of the induction heating device such that the second lighting unit has a color coordinate value corresponding to a set temperature;
    detecting a temperature of the cooking utensil; and
    performing control such that as a difference between the temperature of the cooking utensil and the set temperature decreases, the first lighting unit is to have a color coordinate value that is closer to the color coordinate value of the second lighting unit.

* * * * *